United States Patent
Miyake et al.

(10) Patent No.: US 12,122,343 B2
(45) Date of Patent: Oct. 22, 2024

(54) CONTROL DEVICE FOR VEHICLE, ACTUATOR SYSTEM, CONTROL METHOD, NON-TRANSITORY STORAGE MEDIUM, AND VEHICLE

(71) Applicants: TOYOTA JIDOSHA KABUSHIKI KAISHA, Toyota (JP); ADVICS CO., LTD., Kariya (JP)

(72) Inventors: Kazuki Miyake, Okazaki (JP); Takuya Yasui, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 362 days.

(21) Appl. No.: 17/491,717

(22) Filed: Oct. 1, 2021

(65) Prior Publication Data
US 2022/0118957 A1 Apr. 21, 2022

(30) Foreign Application Priority Data
Oct. 19, 2020 (JP) .................... 2020-175239

(51) Int. Cl.
*B60T 8/171* (2006.01)
*B60T 7/12* (2006.01)

(52) U.S. Cl.
CPC .............. *B60T 8/171* (2013.01); *B60T 7/12* (2013.01); *B60T 2201/03* (2013.01); *B60T 2220/04* (2013.01)

(58) Field of Classification Search
None
See application file for complete search history.

(56) References Cited

U.S. PATENT DOCUMENTS

| 2005/0269876 A1* | 12/2005 | Higuchi | B60T 7/12 303/155 |
| 2010/0006363 A1* | 1/2010 | Zagorski | B60W 30/08 180/275 |
| 2011/0004385 A1* | 1/2011 | Ishimoto | B60T 7/12 188/106 F |

(Continued)

FOREIGN PATENT DOCUMENTS

| JP | 2007-118880 A | 5/2007 |
| JP | 2019-156225 A | 9/2019 |

(Continued)

*Primary Examiner* — Christian Chace
*Assistant Examiner* — Shayne M. Gilbertson
(74) *Attorney, Agent, or Firm* — Oliff PLC

(57) ABSTRACT

A control device for a vehicle includes: an accepting unit configured to accept a first braking request from a plurality of applications that realize a driving assistance function; an acquiring unit configured to acquire a second braking request by a driver operation; an arbitrating unit configured to perform arbitration of the first braking request and the second braking request; and an output unit configured to output a request to an actuator based on a result of the arbitration by the arbitrating unit, wherein the arbitrating unit is configured to, when the acquiring unit acquires the second braking request while the output unit is outputting the request to the actuator, perform the arbitration in which the request that the output unit outputs to the actuator is increased or maintained, based on the second braking request.

11 Claims, 3 Drawing Sheets

(56) References Cited

U.S. PATENT DOCUMENTS

| | | | |
|---|---|---|---|
| 2013/0173130 A1* | 7/2013 | Vollert | B60T 7/042 |
| | | | 701/70 |
| 2017/0297547 A1* | 10/2017 | Goto | B60T 13/745 |
| 2019/0193569 A1* | 6/2019 | Oh | B60L 7/26 |
| 2019/0283581 A1 | 9/2019 | Yokota et al. | |
| 2020/0070802 A1 | 3/2020 | Yamada | |
| 2020/0324744 A1* | 10/2020 | Mizusaki | B60T 13/686 |
| 2022/0080935 A1* | 3/2022 | Terada | B60T 8/92 |

FOREIGN PATENT DOCUMENTS

| JP | 2020-032892 A | 3/2020 |
|---|---|---|
| WO | 2016/158508 A1 | 10/2016 |

* cited by examiner

CONTROL DEVICE FOR VEHICLE, ACTUATOR SYSTEM, CONTROL METHOD, NON-TRANSITORY STORAGE MEDIUM, AND VEHICLE

CROSS-REFERENCE TO RELATED APPLICATION

This application claims priority to Japanese Patent Application No. 2020-175239 filed on Oct. 19, 2020, incorporated herein by reference in its entirety.

BACKGROUND

1. Technical Field

The present disclosure relates to a control device for a vehicle, an actuator system, a control method, a non-transitory storage medium, and a vehicle.

2. Description of Related Art

In recent years, applications that realize various types of driving assistance functions are implemented in vehicles. Japanese Unexamined Patent Application Publication No. 2019-156225 (JP 2019-156225 A) discloses a control device that performs driving assistance in which a braking actuator is automatically operated for deceleration of a vehicle.

The control device described in JP 2019-156225 A changes computation methods of deceleration that an automated driving application requests when a driver performs brake operations during automated driving, so that the deceleration requested by the driver is reflected in vehicle behavior as intended. Thus, the driver can obtain an expected sense of deceleration.

SUMMARY

In vehicles installed with an electronic control unit (ECU) that has an application for realizing driving assistance functions, how to reflect driver requests in application requests to realize control depends on the ECU. Accordingly, when a great number of ECUs having applications that realize driving assistance functions are installed in a vehicle, and there is slight difference among these plurality of ECUs regarding methods to realize requests, the driver may be given an unnatural sensation.

The present disclosure provides a control device for a vehicle, an actuator system, a control method, a non-transitory storage medium, and a vehicle, by which unnatural sensations given to the driver can be reduced, even when a great number of ECUs having applications that realize driving assistance functions are installed in the vehicle.

A control device for a vehicle, according to a first aspect of the present disclosure includes a processor configured to: accept a first braking request from a plurality of applications that realize a driving assistance function; acquire a second braking request by a driver operation; perform arbitration of the first braking request and the second braking request; output a request to an actuator based on a result of the arbitration by the processor; and when acquiring the second braking request while outputting the request to the actuator, perform the arbitration in which the request that the processor outputs to the actuator is increased or maintained, based on the second braking request.

An actuator system according to a second aspect of the present disclosure is configured to be input a first motion request from a manager (MGR) that is configured to i) accept requested kinematic plans from a plurality of devices in which functions of a plurality of advanced driver-assistance system (ADAS) applications are implemented, ii) perform arbitration of the plurality of requested kinematic plans that are accepted, and iii) calculate the first motion request relating to integrated braking by the ADAS applications based on the requested kinematic plans following the arbitration, and that is installed in a vehicle. The actuator system includes a processor configured to: acquire a second motion request relating to braking by a driver operation; perform arbitration of the first motion request and the second motion request; output, to an actuator, a request to realize a motion request obtained from the arbitration by the processor; and when acquiring the second motion request while outputting the request to the actuator, perform the arbitration in which the request that the processor outputs to the actuator is increased or maintained, based on the second motion request.

A control method according to a third aspect of the present disclosure is executed by a computer of a control device installed in a vehicle. The control method includes: accepting a first braking request from a plurality of applications that realize a driving assistance function; acquiring a second braking request by a driver operation; performing arbitration of the first braking request and the second braking request; and outputting a request to an actuator based on a result of the arbitration, and performing, when acquiring the second braking request while outputting the request to the actuator, the arbitration in which the request output to the actuator is increased or maintained, based on the second braking request.

A non-transitory storage medium according to a fourth aspect of the present disclosure stores a control program that is executable by a computer of a control device installed in a vehicle, and that causes the computer to execute the control method according to the third aspect.

A vehicle according to a fifth aspect of the present disclosure includes the control device according the first aspect.

According to the present disclosure, arbitration processing of a plurality of requests from applications and requests from the driver can be unified even when a great number of ECUs having applications that realize driving assistance functions are installed in the vehicle, and unnatural sensations given to the driver can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The control device according to the present disclosure performs arbitration together of braking requests generated by a plurality of applications that use automated braking functions, and a braking request generated by a driver operating a brake pedal. Accordingly, even when a great number of ECUs having applications that realize driving assistance functions are installed in the vehicle, arbitration processing of a plurality of requests from the applications and the request from the driver can be unified, and accordingly unnatural sensations given to the driver can be reduced. An embodiment of the present disclosure will be described in detail below, with reference to the drawings.

Configuration

Figure 1:
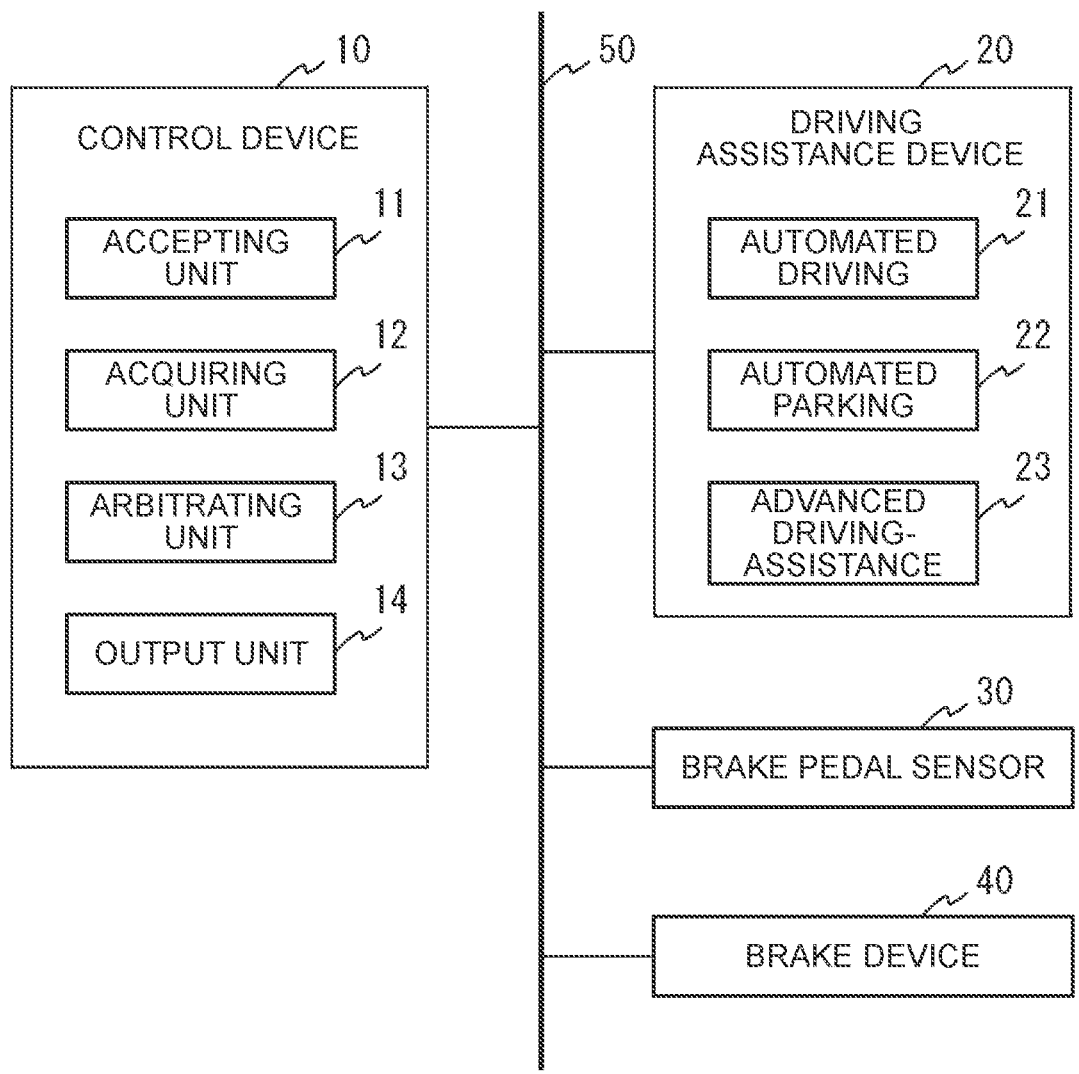
FIG. 1 is a configuration diagram of a control device according to an embodiment of the present disclosure, and surrounding portions thereof.

FIG. 1 is a diagram illustrating the configuration of a control device 10 for a vehicle according to an embodiment of the present disclosure, and surrounding portions thereof. The control device 10 illustrated in FIG. 1 is communicably connected to a driving assistance device 20, a brake pedal sensor 30, and a brake device 40, via an in-vehicle network 50. Examples of the in-vehicle network 50 include a Controller Area Network (CAN), Ethernet (registered trademark), and so forth.

The driving assistance device 20 is a configuration for realizing various types of functions for assisting driving of a vehicle, including at least driving control and braking control of the vehicle, by executing predetermined applications. An automated driving application 21 that realizes automated driving functions, an automated parking application 22 that realizes automated parking functions, and an advanced driving-assistance application 23, are illustrated as examples of applications implemented in the driving assistance device 20 in the present embodiment. The advanced driving-assistance application 23 includes a plurality of advanced driver-assistance system (ADAS) applications, such as an application that realizes adaptive cruise control (ACC) functions in which a vehicle traveling ahead is followed, an application that realizes lane keeping assistance (LKA) functions in which lane maintaining is performed, an application that realizes collision mitigation braking (autonomous emergency braking (AEB)) functions to reduce damage in a collision, and so forth. The driving assistance device 20 outputs requested kinematic plans (forward/reverse acceleration/deceleration, etc.) guaranteeing functionality (merchantability) of the application alone, based on information of the vehicle acquired from various types of sensors and so forth that are omitted from illustration.

The driving assistance device 20 is realized by a computer, such as an ECU that has a processor such as a central processing unit (CPU), memory, and an input/output interface. The number of applications implemented in the driving assistance device 20 is not limited to the three illustrated in FIG. 1, and may be two or less, or four or more. Also, an individual ECU may be provided for each of the applications, as the driving assistance device 20. Also, an automated driving ECU in which the automated driving application 21 is implemented, and an automated parking ECU in which the automated parking application 22 is implemented, and an ADAS-ECU in which the advanced driving-assistance application 23 is implemented, for example, may make up the driving assistance device 20. Further, a plurality of ADAS applications may be implemented in a plurality of devices, such as an ECU in which an ADAS application that realizes ACC functions is implemented, an ECU in which an ADAS application that realizes LKA functions is implemented, an ECU in which an ADAS application that realizes AEB functions is implemented.

The brake pedal sensor 30 is a configuration for detecting the amount of depression of the brake pedal operated by the driver of the vehicle (hereinafter referred to as "brake pedal operation amount"). The brake pedal sensor 30 is attached to a brake mechanism or the like of the vehicle.

The brake device 40 is one of systems for realizing requested kinematic plans that the driving assistance device 20 outputs (realizing system), and is an actuator that generates braking force by frictional force against members that rotate along with wheels. The brake device 40 controls movement of the vehicle based on a hydraulic control amount derived from a motion request regarding braking that is calculated by the control device 10.

The control device 10 decides control contents relating to at least braking, out of motions of the vehicle, based on requested kinematic plans accepted from the driving assistance device 20 and the brake pedal operation amount acquired from the brake pedal sensor 30, and performs control by giving instructions relating to braking that is necessary to the brake device 40, based on the decided control contents. The control device 10 functions as a so-called manager relating to motion of the vehicle (ADAS-MGR, Vehicle-MGR, etc.), or as part of a manager, and controls movement of the vehicle. The control device 10 includes an accepting unit 11, an acquiring unit 12, an arbitrating unit 13, and an output unit 14.

The accepting unit 11 accepts requested kinematic plans output from each of the applications of the driving assistance device 20 (the automated driving application 21, the automated parking application 22, and the advanced driving-assistance application 23). The requested kinematic plan according to the present embodiment is also a first braking request for calculating a motion request, requesting the vehicle for braking force corresponding to an automated brake control amount output from the application providing automated braking. Examples of kinematic plans include deceleration in the front-rear direction (longitudinal direction) of the vehicle, and so forth.

The acquiring unit 12 sequentially acquires the brake pedal operation amount detected by the brake pedal sensor 30. The brake operation (driver operation) that the driver performs in the present embodiment is a motion request (second braking request) requesting braking force from the vehicle corresponding to the brake pedal operation amount. The acquiring unit 12 is able to judge whether there is a brake operation performed by the driver, directionality of the brake operation (increasing pedal depression, maintaining pedal steady, reducing pedal depression), rate of change in brake operations, and so forth, based on brake pedal operation amount acquired from the brake pedal sensor 30.

The arbitrating unit 13 arbitrates a plurality of first braking request (first motion requests) that the accepting unit 11 has accepted from the driving assistance device 20. Also, when the acquiring unit 12 judges that there is a brake operation by the driver, the arbitrating unit 13 arbitrates the first braking requests and the second braking request (second motion request) in accordance with the brake pedal operation amount. Examples of arbitration processing include selecting one braking request from a plurality of braking requests based on a predetermined selection standard, and setting a new braking request based on the braking requests. Note that the arbitrating unit 13 may arbitrate braking requests based on an operating state of the brakes or information representing availability, acquired from the brake device 40.

The output unit 14 calculates and outputs (distributes) braking force for deriving the hydraulic control amount of the brake device 40, as a motion request toward the brake device 40 that is the braking actuator, based on the arbitration results of the braking requests at the arbitrating unit 13.

In the following description, braking force calculated based on arbitration results of the first braking requests (automated brake control amount) will be referred to as "automated brake requested braking force", and braking force calculated based on the second braking request (brake pedal operation amount) will be referred to as "driver requested braking force". Note that braking force may be braking torque.

Note that the configuration of the equipment installed in the vehicle and the configuration of the control device 10 that are described above are exemplary, and additions, substitutions, modifications, omissions, and so forth can be made as appropriate. Also, the functions of each of the pieces of equipment can be implemented as appropriate by being integrated into one piece of equipment, or by being distributed among a plurality of pieces of equipment. For example, a functional portion for arbitrating the first braking requests (requested kinematic plans) at the arbitrating unit 13 may be configured in the control device 10, and a functional portion of the arbitrating unit 13 that performs arbitration of the results of arbitrating the first braking requests with the second braking request may be configured in a separate independent device (e.g., an actuator ECU). When employing this configuration, the functional portions of the acquiring unit 12 that acquire the brake pedal operation amount, and the output unit 14, which output motion requests to the brake device 40, may be configured in a separate device.

Control

Figure 2:
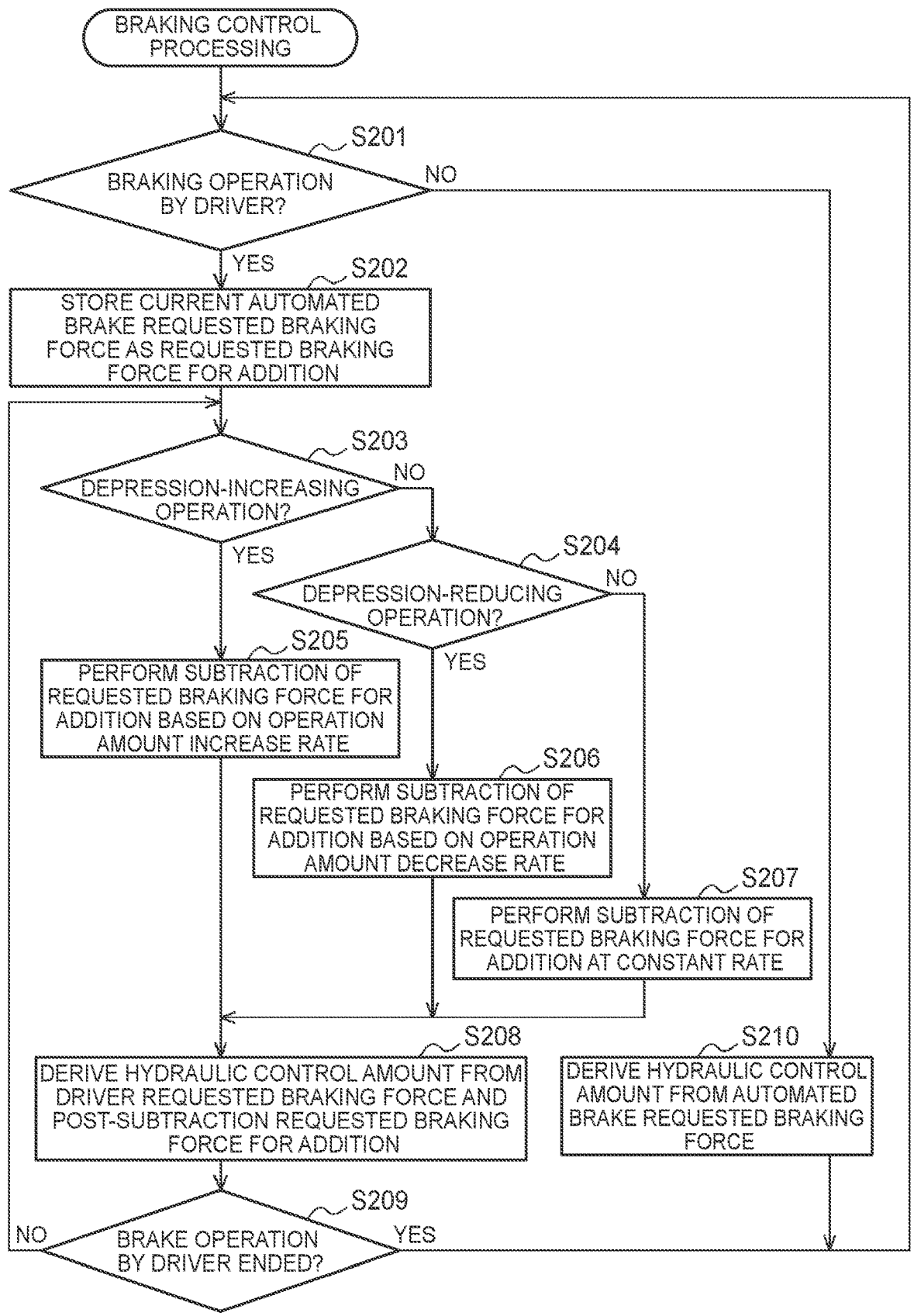
FIG. 2 is a flowchart illustrating braking control processing according to the embodiment of the present disclosure.

Braking control processing executed by the control device 10 according to the present embodiment will be described further with reference to FIG. 2. FIG. 2 is a flowchart illustrating the braking control processing that the configurations of the control device 10 execute.

The braking control processing illustrated in FIG. 2 is started upon the first braking request for operating automated braking being output from the driving assistance device 20, and the automated brake requested braking force being calculated by the control device 10 based on this first braking request. This braking control processing is then repeatedly executed until there are no more first braking requests for operating automated braking from the driving assistance device 20, i.e., until automated brake requested braking force is calculated no more.

Step S201

The acquiring unit 12 determines whether there is a brake operation of the driver depressing the brake pedal, based on the detection results of the brake pedal sensor 30. When the acquiring unit 12 determines that there is a brake operation by the driver (YES in step S201), the processing advances to step S202, and when the acquiring unit 12 determines that there is no brake operation by the driver (NO in step S201), the processing advances to step S210.

Step S202

The arbitrating unit 13 stores automated brake requested braking force (current automated brake requested braking force) already calculated based on the first braking request at the point in time of the acquiring unit 12 determining that there is a brake operation by the driver in a storage unit or the like, omitted from illustration, as "requested braking force for addition". Upon the requested braking force for addition being stored, the processing advances to step S203.

Step S203

The arbitrating unit 13 determines whether a depression-increasing operation, in which the brake pedal operation amount increases, is being performed, based on the brake operation of the driver acquired by the acquiring unit 12. When the arbitrating unit 13 determines that a brake pedal depression-increasing operation is being performed (YES in step S203), the processing advances to step S205, and when the arbitrating unit 13 determines that a brake pedal depression-increasing operation is not being performed (NO in step S203), the processing advances to step S204.

Step S204

The arbitrating unit 13 determines whether a depression-reducing operation (ease off operation), in which the brake pedal operation amount decreases, is being performed, based on the brake operation of the driver acquired by the acquiring unit 12. When the arbitrating unit 13 determines that a brake pedal depression-reducing operation is being performed (YES in step S204), the processing advances to step S206, and when the arbitrating unit 13 determines that a brake pedal depression-reducing operation is not being performed (NO in step S204), the processing advances to step S207.

Step S205

The arbitrating unit 13 performs computation of reducing the requested braking force for addition stored in step S202 above, based on an operation amount increase rate, which is a rate of the brake pedal depression amount increasing, and derives a post-subtraction requested braking force for addition. The degree of how much to reduce the requested braking force for addition by, based on the operation amount increase rate, is appropriately set so as to eliminate or reduce unnatural sensations given to the driver who is stepping deeper on the brakes to strengthen the braking, based on the weight of the vehicle, braking capabilities of the brake device 40, and so forth. When subtraction of the requested braking force for addition is performed, the processing advances to step S208.

Step S206

The arbitrating unit 13 performs computation of reducing the requested braking force for addition stored in step S202 above, based on an operation amount decrease rate, which is a rate of the brake pedal depression amount decreasing, and derives a post-subtraction requested braking force for addition. The degree of how much to reduce the requested braking force for addition by, based on the operation amount decrease rate, is appropriately set so as to eliminate or reduce unnatural sensations given to the driver who is letting up on the brakes to weaken the braking, based on the weight of the vehicle, braking capabilities of the brake device 40, and so forth. When subtraction of the requested braking force for addition is performed, the processing advances to step S208.

Step S207

The arbitrating unit 13 determines that the operation amount of the brake pedal is neither increased depression nor reduced depression, but is maintained constant. The arbitrating unit 13 performs computation of reducing the requested braking force for addition stored in step S202 above by a constant rate, and derives a post-subtraction requested braking force for addition. The constant rate to reduce the requested braking force for addition by is appropriately set so as to eliminate or reduce unnatural sensations given to the driver who is stepping constant on the brakes to maintain the braking, based on the weight of the vehicle, braking capabilities of the brake device 40, and so forth. When subtraction of the requested braking force for addition is performed, the processing advances to step S208.

Step S208

The arbitrating unit 13 derives the hydraulic control amount of the brake device 40, based on the driver requested braking force calculated in accordance with the second braking request, and the requested braking force for addition after subtraction in one of the above steps S205 through S207. Specifically, the arbitrating unit 13 obtains a new braking force by adding the post-subtraction requested braking force for addition to the driver requested braking force, and drives the hydraulic control amount of the brake device 40 based on this newly-obtained braking force. Upon the hydraulic control amount being derived, the processing advances to step S209.

Step S209

The acquiring unit 12 determines whether the brake operation of the driver depressing the brake pedal has ended, based on detection results of the brake pedal sensor 30. When the acquiring unit 12 determines that the brake operation of the driver has ended (YES in step S209), the processing advances to step S201, and when the acquiring unit 12 determines that the brake operation of the driver has not yet ended (NO in step S209), the processing advances to step S203.

Step S210

The arbitrating unit 13 derives the hydraulic control amount of the brake device 40, based on the automated brake requested braking force calculated in accordance with the first braking request. Upon the hydraulic control amount being derived, the processing advances to step S201.

Figure 3:
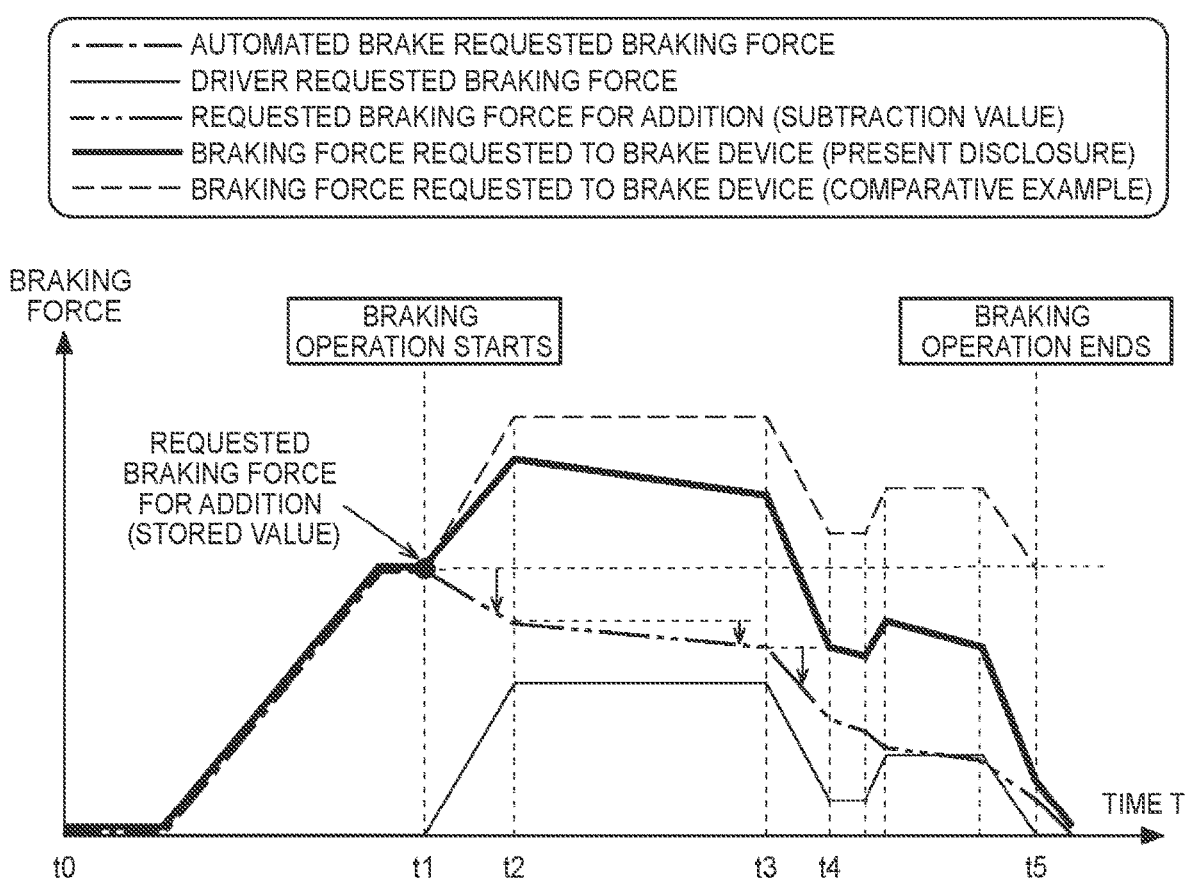
FIG. 3 is a graph illustrating braking control processing according to the embodiment of the present disclosure.

An example of the above braking control processing will be described with reference to FIG. 3. FIG. 3 is a graph in which the horizontal axis represents time T, and the vertical axis represents braking force. In FIG. 3, the long dashed short dashed line indicates the automated brake requested braking force calculated based on the first braking request, the thin continuous line indicates the driver requested braking force calculated based on the second braking request, the long dashed double-short dashed line indicates the requested braking force for addition that is reduced based on brake pedal operations, and the thick continuous line indicates braking force serving as the motion request output to the brake device 40. Also, as a comparative example, the dashed line indicates braking force output to the brake device 40 by a control device that simply adds the automated brake requested braking force and the driver requested braking force at the point in time of determining that there is a brake operation by the driver.

During a period in which a brake operation of the driver depressing the brake pedal is not occurring (t0≤T<t1), the automated brake requested braking force is the braking force generated at the brake device 40 without change (the long dashed short dashed line and the thick continuous line are the same).

At time T=t1, upon a brake operation of the driver depressing the brake pedal starting, the automated brake requested braking force calculated at that time is stored as the requested braking force for addition.

Thereafter, during a period in which the driver is performing a brake pedal depression-increasing operation (t1≤T<t2), a braking force, obtained by adding the requested braking force for addition (long dashed double-short dashed line), reached by subjecting the requested braking force for addition (stored value) to reduction based on the operation amount increase rate, to the driver requested braking force (thin continuous line), is the braking force generated by the brake device 40 (thick continuous line).

Thereafter, during a period in which the amount of depression of the brake pedal by the driver is maintained constant (t2≤T≤t3), a braking force, obtained by adding a requested braking force for addition (long dashed double-short dashed line) reached by further reducing the current requested braking force for addition by a constant rate, to the driver requested braking force (thin continuous line), is the braking force generated by the brake device 40 (thick continuous line).

Subsequently, during a period in which the driver is performing a brake pedal depression-reducing operation (t3<T<t4), a braking force, obtained by adding a requested braking force for addition (long dashed double-short dashed line) reached by further reducing the current requested braking force for addition based on an operation amount decrease rate, to the driver requested braking force (thin continuous line), is the braking force generated by the brake device 40 (thick continuous line).

Thereafter as well, during a period until brake operations by the driver end (t4≤T<t5), a braking force, obtained by adding the requested braking force for addition (long dashed double-short dashed line) subjected to subtraction processing based on brake pedal operations of the driver (increasing pedal depression, maintaining pedal steady, reducing pedal depression), to the driver requested braking force (thin continuous line), is derived as the braking force generated by the brake device 40 (thick continuous line).

Thus, with the braking control processing according to the present embodiment, when a brake operation is performed by the driver while automated brake control by an application is operating, the braking force generated at the brake device 40 is increased by adding part of the automated brake requested braking force at the point in time of determining that there is a brake operation by the driver, which is decided in accordance with the brake operation of the driver, to the driver requested braking force, rather than simply adding the automated brake requested braking force at the point in time of determining that there is a brake operation by the driver and the driver requested braking force. According to this control, immediately after a brake operation is started by the driver, braking force is generated that is around the same level as braking force obtained by adding the driver requested braking force to the automated brake requested braking force, and yet when the driver is preparing to end the brake operation due to the vehicle decelerating and almost coming to a stop, the automated brake requested braking force (requested braking force for addition) by automated brake control can be reduced to zero or close to zero. Accordingly, a situation can be suppressed in which the driver performs a brake ease off operation immediately before the vehicle stops, for a soft stop, but braking force based on the automated brake control remains. Accordingly unnatural sensations given to the driver regarding behavior of the vehicle can be reduced.

Effects and Advantages

As described above, according to an embodiment of the present disclosure, the control device 10 performs arbitration together of braking requests generated by the applications that use automated braking functions, and a braking request generated by the driver operating the brake pedal. By performing processing in this way, even when a great number of ECUs having applications that realize driving assistance functions are installed in the vehicle, arbitration processing of the requests from the applications and the request from the driver can be unified, and accordingly unnatural sensations given to the driver can be reduced.

Also, according to the control device 10 of the present embodiment, in a situation in which the driver performs a brake operation while automated braking is operating, thereby cancelling (overriding) the automated brake control, the automated brake control amount at that point in time is comprehended as being part of the braking force that the driver requests, and the braking force comprehended as being a part thereof is added to the braking force estimated by the brake pedal operation amount by the driver, thereby increasing the braking force of the brake device 40. The hydraulic control amount of the brake device 40 is then computed based on the braking force that has increased by adding part of the braking force based on the automated brake control amount to the braking force estimated from this brake pedal operation amount. According to this control, the automated brake requested braking force based on the automated brake control amount can be gradually attenuated while being added to the driver requested braking force, while giving priority to the driver requested braking force based on the brake pedal operation performed by the driver. Accordingly, vehicle behavior that matches the intuition of the driver can be realized, and unnatural sensations given to the driver can be reduced.

Now, a configuration may be made in which, whether to comprehend the control amount of automated braking as part of the braking force that the driver requests, can be selected in accordance with the characteristics of the application requesting the control amount of automated braking. When the control amount of automated braking is not comprehended as being part of the braking force requested by the driver, the braking force of the brake device 40 is maintained at the current state. According to such a configuration, for example, the control device 10 can be applied to vehicles in which are implemented applications that realize functions that comprehend brake operations by the driver to be disturbances regarding the brake control amount computed toward a target stopping position (pre-crash safety (pre-collision system), automated parking, etc.).

Also, according to the control device 10 of the present embodiment, computation regarding braking control is carried out at the control device 10 that controls the brake device 40, and also following detection of a brake pedal operation by the driver, the hydraulic control amount of the brake device 40 is computed referencing only the brake pedal operation amount. Thus, brake control for realizing vehicle behavior that matches the intuition of the driver can be realized with a simple configuration.

Although an embodiment of the technology according to the present disclosure has been described above, the present disclosure is not limited to a control device of braking control functions of a vehicle, and can be understood as a control system including a control device and other devices, a control method executed by a control device provided with a processor and memory, a control program, a computer-readable non-transitory storage medium storing a control program, a vehicle provided with a control device, and so forth.

The present disclosure is useful in a control device installed in a vehicle or the like.

What is claimed is:

1. A control device for a vehicle, the control device comprising a processor configured to:
   accept a plurality of first braking requests from a plurality of applications that each realize a driving assistance function;
   acquire a second braking request by a driver operation;
   perform arbitration of the first braking requests and the second braking request, the arbitration including selecting one first braking request from the plurality of first braking requests based on a predetermined selection standard;
   output a request to an actuator based on a result of the arbitration by the processor; and
   when acquiring the second braking request while outputting the request to the actuator, perform the arbitration in which the request that the processor outputs to the actuator is maintained by adding (i) a braking request obtained by partially reducing the one first braking request at a time at which the second braking request is acquired to (ii) the second braking request.

2. The control device according to claim 1, wherein a value of the one first braking request changes in accordance with the second braking request.

3. The control device according to claim 1, wherein
   the one first braking request is automated brake requested braking force corresponding to a control amount of automated braking,
   the second braking request is driver requested braking force corresponding to an operation amount of a brake pedal, and
   the processor is configured to, when acquiring the driver requested braking force while outputting the request to the actuator, perform the arbitration in which a requested braking force for addition is added to the driver requested braking force, the requested braking force for addition being part of the automated brake requested braking force at a point in time of the processor acquiring the driver requested braking force and varying in accordance with the operation amount of the brake pedal.

4. The control device according to claim 3, wherein the processor is configured to, while the operation amount of the brake pedal increases, reduce the requested braking force for addition based on an increase rate of the operation amount of the brake pedal.

5. The control device according to claim 3, wherein the processor is configured to, while the operation amount of the brake pedal is maintained constant, reduce the requested braking force for addition by a predetermined rate.

6. The control device according to claim 3, wherein the processor is configured to, while the operation amount of the brake pedal decreases, reduce the requested braking force for addition based on a decrease rate of the operation amount of the brake pedal.

7. An actuator system, which is configured to be input a first motion request from a manager (MGR) that is configured to i) accept requested kinematic plans from a plurality of devices in which functions of a plurality of advanced driver-assistance system (ADAS) applications are implemented, ii) perform arbitration of the plurality of requested kinematic plans that are accepted by selecting one kinematic plan from the plurality of requested kinematic plans based on a predetermined selection standard, and iii) calculate the first motion request relating to integrated braking by the ADAS applications based on the requested kinematic plans following the arbitration, and which is installed in a vehicle, the actuator system comprising a processor configured to:

acquire a second motion request relating to braking by a driver operation;

perform arbitration of the first motion request and the second motion request;

output, to an actuator, a request to realize a motion request obtained from the arbitration by the processor; and when acquiring the second motion request while outputting the request to the actuator, perform the arbitration in which the request that the processor outputs to the actuator is maintained by adding (i) a motion request obtained by partially reducing the first motion request at a time at which the second motion request is acquired to (ii) the second motion request.

8. A control method executed by a computer of a control device installed in a vehicle, the method comprising:

accepting a plurality of first braking requests from a plurality of applications that each realize a driving assistance function;

acquiring a second braking request by a driver operation;

performing arbitration of the first braking requests and the second braking request, the arbitration including selecting one first braking request from the plurality of first braking requests based on a predetermined selection standard;

outputting a request to an actuator based on a result of the arbitration; and performing, when acquiring the second braking request while outputting the request to the actuator, the arbitration in which the request output to the actuator is maintained by adding (i) a braking request obtained by partially reducing the one first braking request at a time at which the second braking request is acquired to (ii) the second braking request.

9. A non-transitory storage medium storing a control program that is executable by a computer of a control device installed in a vehicle, and that causes the computer to execute the control method according to claim 8.

10. A vehicle comprising the control device according to claim 1.

11. The control device according to claim 1, wherein the predetermined selection standard is set based on an operating state of brakes of the vehicle or on information representing availability of a brake device, which includes an actuator that generates braking force by way of frictional force against members that rotate along with wheels of the vehicle.

\* \* \* \* \*